United States Patent
Sagi et al.

(10) Patent No.: US 6,308,556 B1
(45) Date of Patent: Oct. 30, 2001

(54) METHOD AND APPARATUS OF NONDESTRUCTIVE TESTING A SEALED PRODUCT FOR LEAKS

(75) Inventors: Nehemiah Hemi Sagi, Carmel; Guosen Ronald Zhang, Fisher; Ranajit Rana Ghosh, Indianapolis, all of IN (US)

(73) Assignee: ATC, Inc., Indianapolis, IN (US)

( * ) Notice: Subject to any disclaimer, the term of this patent is extended or adjusted under 35 U.S.C. 154(b) by 0 days.

(21) Appl. No.: 09/466,341

(22) Filed: Dec. 17, 1999

(51) Int. Cl.$^7$ .............................. G01M 3/04; G01M 3/00
(52) U.S. Cl. ................................. 73/40; 73/45.4; 73/52
(58) Field of Search ............................ 73/40, 45.4, 49.3, 73/49.6, 52

(56) References Cited

U.S. PATENT DOCUMENTS

| 4,118,973 | 10/1978 | Tucker et al. . |
| 4,427,030 | 1/1984 | Jouwsma . |
| 4,524,616 | 6/1985 | Drexel et al. . |

(List continued on next page.)

OTHER PUBLICATIONS

A "Universal Calibration Curve" for Laminar Flowmeters, by David A. Todd, Jr.
Guidance for Industry, Container and Closure Integrity Testing in Lieu of Sterility Testing as a Component of the Stability Protocol for Sterile Products, Draft Guidance—Not for Implementation, dated Jan. 28, 1998.
A survey of flow at low pressures, by Scott L. Thomson and William R. Owens, dated Aug. 19, 1974.
Experimental data and theoretical modeling of gas flows through metal capillary leaks, by S A Tison, dated Jan. 25, 1993.
Varian Vacuum Technologies, Product Catalog 2000, Solutions for the millennium and beyond, by Varian.
Pumping and leak detection systems Products Catalogue, by Alcatel.

*Primary Examiner*—Hezron Williams
*Assistant Examiner*—Jay L. Poutzer
(74) *Attorney, Agent, or Firm*—Bose McKinney & Evans LLP

(57) ABSTRACT

A leak detection system for testing a sealed product for leaks includes a test chamber, a pressure system that is operable to maintain a substantially constant pressure during a test period, and a leak sensor coupled to the test chamber via a first conduit and the pressure system via a second conduit. The test chamber of the leak detection system includes a receptacle dimensioned to receive the sealed product. Moreover, the test chamber includes a cover dimensioned to operably seal the receptacle at an initial internal pressure when placed into position with the receptacle. The leak sensor of the leak detection system is operable to permit gas flow between the test chamber and the pressure system via the first conduit and the second conduit. The leak sensor is also operable to obtain a value representative of total mass of the gas flow between the sealed test chamber and the pressure system during the test period. Furthermore, the leak detection system is operable to determine, based upon the value obtained for the total mass of the gas flow, whether the sealed product leaked an unacceptable amount during the test period.

16 Claims, 6 Drawing Sheets

U.S. PATENT DOCUMENTS

| | | |
|---|---|---|
| 4,768,372 | 9/1988 | Lehmann . |
| 4,841,776 | 6/1989 | Kawachi et al. . |
| 4,896,530 | 1/1990 | Lehmann . |
| 5,029,464 * | 7/1991 | Lehmann ............................ 73/49.3 |
| 5,042,291 | 8/1991 | Lehmann . |
| 5,044,199 | 9/1991 | Drexel et al. . |
| 5,099,881 | 3/1992 | Nakajima . |
| 5,170,660 | 12/1992 | Lehmann . |
| 5,199,296 | 4/1993 | Lehmann . |
| 5,239,859 * | 8/1993 | Lehmann ............................ 73/49.2 |
| 5,269,171 | 12/1993 | Boyer . |
| 5,287,729 | 2/1994 | Lehmann . |
| 5,297,427 | 3/1994 | Shambayati . |
| 5,305,638 | 4/1994 | Saghatchi et al. . |
| 5,333,491 | 8/1994 | Lehmann . |
| 5,398,721 | 3/1995 | Pryor . |
| 5,445,035 | 8/1995 | Delajoud . |
| 5,497,654 | 3/1996 | Lehmann . |
| 5,535,624 | 7/1996 | Lehmann . |
| 5,554,805 | 9/1996 | Bahrton . |
| 5,760,294 | 6/1998 | Lehmann . |
| 5,861,546 | 1/1999 | Sagi et al. . |
| 5,907,093 | 5/1999 | Lehmann . |
| 5,915,270 | 6/1999 | Lehmann . |
| 5,962,776 | 10/1999 | Lehmann . |
| 6,082,184 | 7/2000 | Lehmann . |
| 6,167,750 | 1/2001 | Lehmann . |
| 6,185,987 | 2/2001 | Lehmann . |
| 6,202,744 | 3/2001 | Lehmann . |

* cited by examiner

METHOD AND APPARATUS OF NONDESTRUCTIVE TESTING A SEALED PRODUCT FOR LEAKS

FIELD OF THE INVENTION

The present invention relates generally to product testing, and more particularly to a method and apparatus for determining whether a sealed product contains holes that permit an unacceptable amount of gas flow into or out of the sealed product.

BACKGROUND OF THE INVENTION

Many products are produced in an air-tight manner for environmental, health, freshness, operational and/or other reasons. To meet the need for air-tight products, test equipment have been developed to test certain types of products for leaks. For example, U.S. Pat. No. 5,861,546 ('546 Patent) to Sagi et al., the disclosure of which is hereby incorporated by reference, discloses a leak detection apparatus that is suitable for detecting leaks in a product having an opening to which a leak sensor and a vacuum system may be coupled in order to form a closed test system. Once coupled to the opening of the product, the vacuum system exerts a low vacuum on the product thus resulting in gas flow from the product through the leak sensor to the vacuum system. Assuming that the product does not have a gross leak, the pressure within the product and the pressure maintained by the vacuum system will eventually equalize and enter a steady state condition. Once equalization occurs, the leak sensor determines the steady state mass flow rate for the gas flow between the product and the vacuum system which is indicative of the level of leakage occurring in the closed test system. Assuming all leakage in the closed test system is attributable to the product under test, a detected mass flow rate of zero would indicate the product contains no leaks, a small mass flow rate would indicate the product contains a small leak, and a larger mass flow rate would indicate the product contains a larger leak. The leak sensor then determines a test result based upon the mass flow rate and predetermined tolerances.

One disadvantage of the leak detection system of the '546 Patent is that the product to be tested is generally required to include some sort of opening to which the leak sensor and the vacuum system may be coupled in order to form the closed test system. While certain products such as automotive engines and heat exchangers include openings to which the leak sensor and the vacuum system may be coupled, many other products do not include such an opening. For example, many medical products are distributed and stored in sealed, air-tight packages in order to maintain freshness, maintain sterility, and/or prevent harm to the surrounding environment. These packaged medical products by design do not include openings. Accordingly, these packaged medical products cannot be tested by the leak detection system of the '546 Patent in a non-destructive manner.

A need, therefore, exists for a method and apparatus that are suitable for testing sealed products (i.e. products that contain no openings) for leaks.

SUMMARY OF THE INVENTION

The present invention addresses the above-identified need, as well as others, with a method and apparatus of testing a sealed product for leaks. In accordance with one embodiment of the present invention, there is provided a method of nondestructive testing a sealed product for leaks. The method includes the steps of placing the sealed product into a test chamber, and sealing the test chamber after the placing step to obtain a sealed test chamber at an initial internal pressure. Another step of the method includes maintaining in a pressure system, a substantially constant internal pressure that is different than the initial internal pressure of the sealed test chamber. Yet another step of the method includes permitting gas flow between the sealed test chamber and the pressure system during the test period thereby causing the sealed test chamber to approach the substantially constant internal pressure of the pressure system. The method also includes the step of obtaining a value representative of a total mass of the gas flow between the sealed test chamber and the pressure system during the test period. Moreover, the method includes the step of determining, based upon the value obtained for the total mass of the gas flow, whether the sealed product leaked an unacceptable amount during the test period.

Pursuant to another embodiment of the present invention, there is provided a leak detection system for nondestructive testing a sealed product for leaks. The leak detection system includes a test chamber, a pressure system that is operable to maintain a substantially constant pressure during a test period, and a leak sensor coupled to the test chamber via a first conduit and the pressure system via a second conduit. The test chamber of the leak detection system includes a receptacle dimensioned to receive the sealed product. Moreover, the test chamber includes a cover dimensioned to operably seal the receptacle at an initial internal pressure when placed into position with the receptacle. The leak sensor of the leak detection system is operable to permit gas flow between the test chamber and the pressure system via the first conduit and the second conduit. The leak sensor is also operable to obtain a value representative of total mass of the gas flow between the sealed test chamber and the pressure system during the test period. Furthermore, the leak detection system is operable to determine, based upon the value obtained for the total mass of the gas flow, whether the sealed product leaked an unacceptable amount during the test period.

Pursuant to a further embodiment of the present invention, there is provided a leak sensor for use with a pressure system operable to maintain a substantially constant pressure during a test period and a sealed test chamber containing a sealed product. The leak sensor includes a body, a differential pressure sensor, a temperature sensor, a static pressure sensor, and a microcontroller. The body of the leak sensor includes a first end portion that is operable to be coupled to the test chamber via a first conduit and a second end portion that is operable to be coupled to the pressure system via a second conduit. Moreover, the body of the leak sensor includes a laminar flow gap between the first end portion and the second end portion that causes gas flowing through the body to exhibit substantially laminar flow characteristics during the test period.

The differential pressure sensor of the leak sensor is connected to a first point and a second point of the laminar flow gap. Furthermore, the differential pressure sensor is operable to generate a differential pressure signal that is representative of the differential pressure between the first point and the second point of the laminar flow gap. The temperature sensor of the leak sensor is operable to generate a temperature signal representative of temperature of the gas flow through the laminar flow gap, and the static pressure sensor of the leak sensor is operable to generate a static pressure signal representative of static pressure developed by the gas flow through the laminar flow gap.

The microcontroller of the leak sensor is connected to the differential pressure sensor, the temperature sensor, and the static pressure sensor. The microcontroller is operable to calculate the value representative of the total mass of the gas flow between the sealed test chamber and the pressure system during the test period based upon the differential pressure signal, the temperature signal, and the static pressure signal. Moreover, the microcontroller is further operable to determine, based upon the value obtained for the total mass of the gas flow, whether the sealed product leaked an unacceptable amount during the test period.

It is an object of the present invention to provide an improved method and apparatus for testing a sealed product for leaks.

It is also an object of the present invention to provide a new and useful method and apparatus for testing a sealed product for leaks.

It is another object of the present invention to provide a method and apparatus that test a sealed product in a non-destructive manner.

It is yet another object of the present invention to provide a method and apparatus that are operable to detect a fine leak of the sealed product.

The above and other objects, features, and advantages of the present invention will become apparent from the following description and the attached drawings.

BRIEF DESCRIPTION OF THE DRAWINGS

In order that the invention can be more clearly ascertained, examples of preferred embodiments will now be described with reference to the accompanying drawings.

DESCRIPTION OF EXEMPLARY EMBODIMENTS

Figure 1:
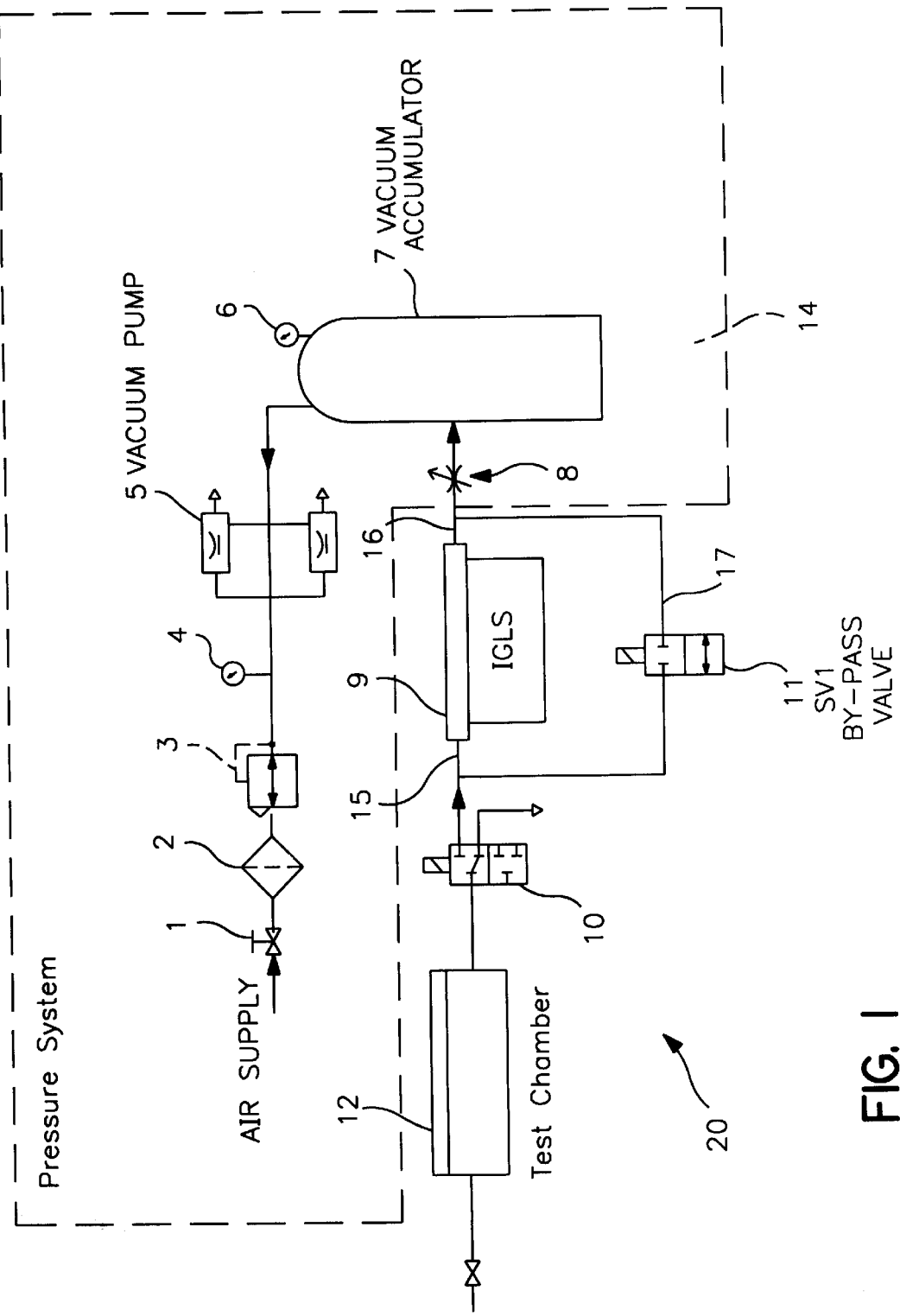
FIG. 1 is a schematic diagram of a leak detection system which incorporates various features of the present invention therein.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

FIG. 1 shows a schematic of a leak detection system 20 that incorporates various features of the present invention.

As depicted the leak detection system 20 includes a test chamber 12, an intelligent gas leak sensor (IGLS) 9, and a pressure system 14. The test chamber 12 is coupled to the IGLS 9 via an inlet conduit 15 and an in-line exhaust/pressure valve 10, and the IGLS 9 is coupled to the pressure system 14 via an outlet conduit 16 and an in-line needle valve 8. Furthermore, the test chamber 12 is coupled to the pressure system 14 via a by-pass conduit 17 and an in-line by-pass valve 11 which provide a gas flow path that by-passes the IGLS 9.

The pressure system 14 is generally operable to maintain a substantially constant reference pressure that is different than the surrounding environment in which the leak detection system 20 is operated. For example, assuming that the leak detection system 20 is operating at typical atmospheric conditions such as 14.7 psia, then the pressure system 14 may be configured to maintain a substantially constant lower reference pressure of 10 psia. While the following description of the leak detection system 20 assumes that the pressure system 14 maintains a slightly lower pressure, the pressure system 14 may alternatively be configured to maintain a slightly higher pressure such as 18 psia thus causing a reverse gas flow and mass to be added to the test chamber 12 instead of extracted from the test chamber 12.

To this end of maintaining a substantially constant reference pressure, the pressure system 14 in an exemplary embodiment includes a vacuum accumulator 7, a pressure gauge 6, a vacuum pump 5, a pressure gauge 4, a pressure control valve 3, an air filter 2, and a ball valve 1 that are serially coupled to one another between an air supply and the outlet conduit 16. In operation, the vacuum accumulator 7 helps to reduce pressure fluctuations within the pressure system 14 and significantly increases overall system performance. While FIG. 1 illustrates a pressure system 14 that is air operated, those skilled in the art should appreciate that the pressure system could be electrically operated.

The IGLS 9 in an exemplary embodiment is operable to control clamping of the test chamber 12, control the exhaust/pressure valve 10, and control the by-pass valve 11. Moreover, the IGLS 9 is generally operable to obtain various measurements of gas flow between the test chamber 12 and the pressure system 14. In particular, the IGLS 9 is operable to obtain a measurement of the mass flow rate of the gas flow through the IGLS 9 at a particular point in time, calculate a total mass of the gas flow through the IGLS 9 during a test period, and determine whether a sealed package has a leak failure based upon the calculated total mass of the gas flow through the IGLS 9 during the test period.

Figure 2:
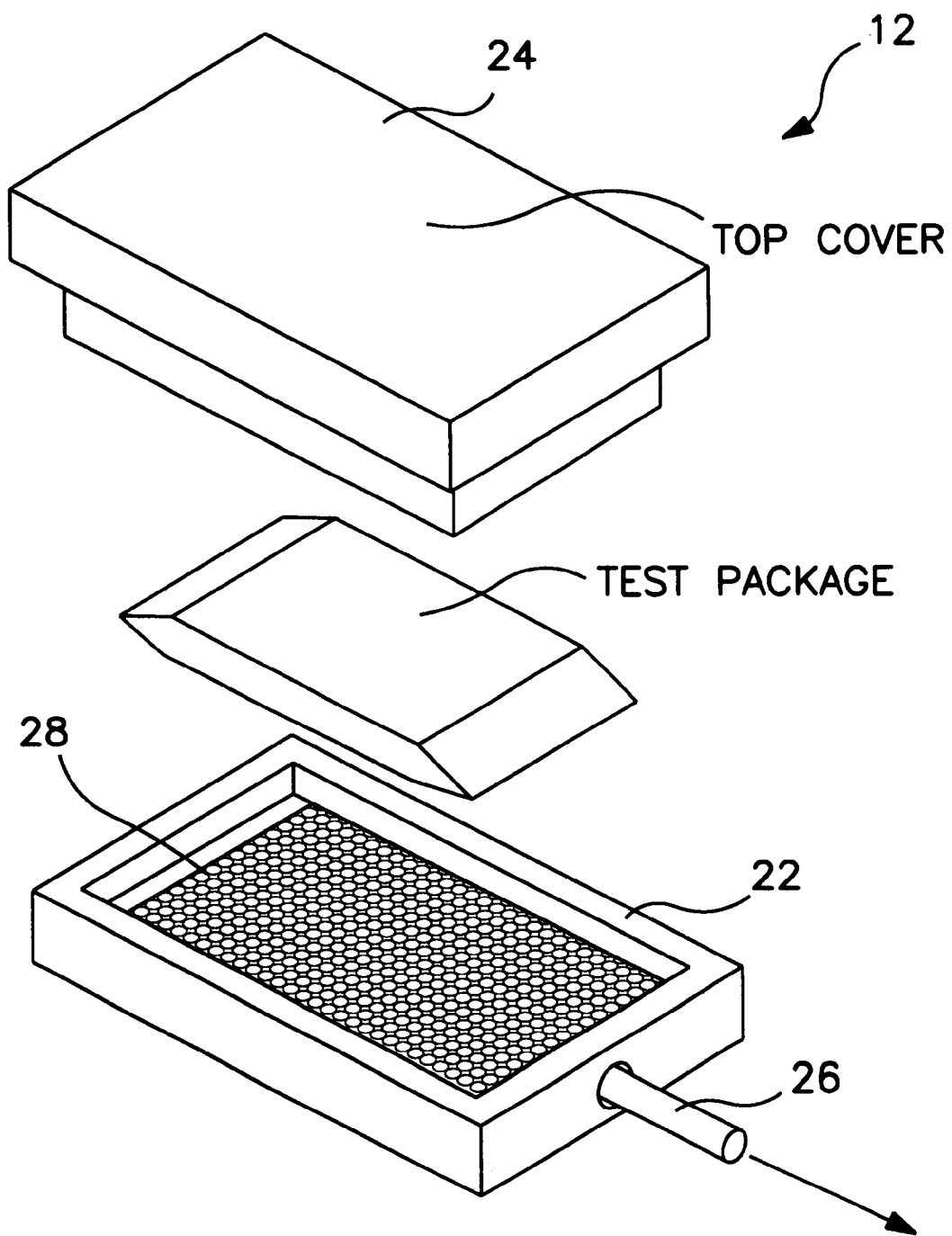
FIG. 2 is a perspective view of the test chamber of the leak detection system shown in FIG. 1.

The test chamber 12 of the leak detection system 20 is generally operable to receive a sealed product such as an air-tight package containing medical supplies, and subject the sealed product to a controlled pressurized environment. To this end, the test chamber 12 as depicted in FIG. 2 includes a receptacle 22 dimensioned to receive the sealed product to be tested for leaks, and a cover 24 that when placed in position with the receptacle 22 is operable to seal the receptacle 22 in an air-tight manner. In order to alter the internal pressure of the test chamber 12 and subject the sealed product to a pressurized environment, the test chamber 12 further includes a outlet port 26 that provides a controllable gas flow path from the interior of the test chamber 12 to the exterior of the test chamber 12. In operation, the outlet port 26 is coupled to the pressure system 14 via the inlet conduit 14 in order to extract gas from the test chamber 12 in a controlled manner and to subject the sealed product to the substantially constant pressure maintained by the pressure system 14. The test chamber 12 further includes a grid 28 that in the exemplary embodiment performs several functions. In particular, the grid 28 helps to prevent excessive contamination of the IGLS 9 by filtering contaminates from the gas flow. Moreover, the grid 28 helps to prevent the sealed package from blocking gas flow through the outlet port 26. Furthermore, the grid 28 along with other is product supports (not shown) of the test chamber 12 help reduce mechanical stress exerted upon the sealed product under test. Those skilled in the art should appreciate that if a low vacuum is applied to the test chamber 12, a flexible sealed product placed in the test chamber 12 will expand due to lower pressure developed within the test chamber 12. The grid 26 along with other product supports of the test chamber 12 help to reduce the amount a flexible sealed product expands within the test chamber 12 in order to prevent the destruction of the sealed product.

Figure 3:
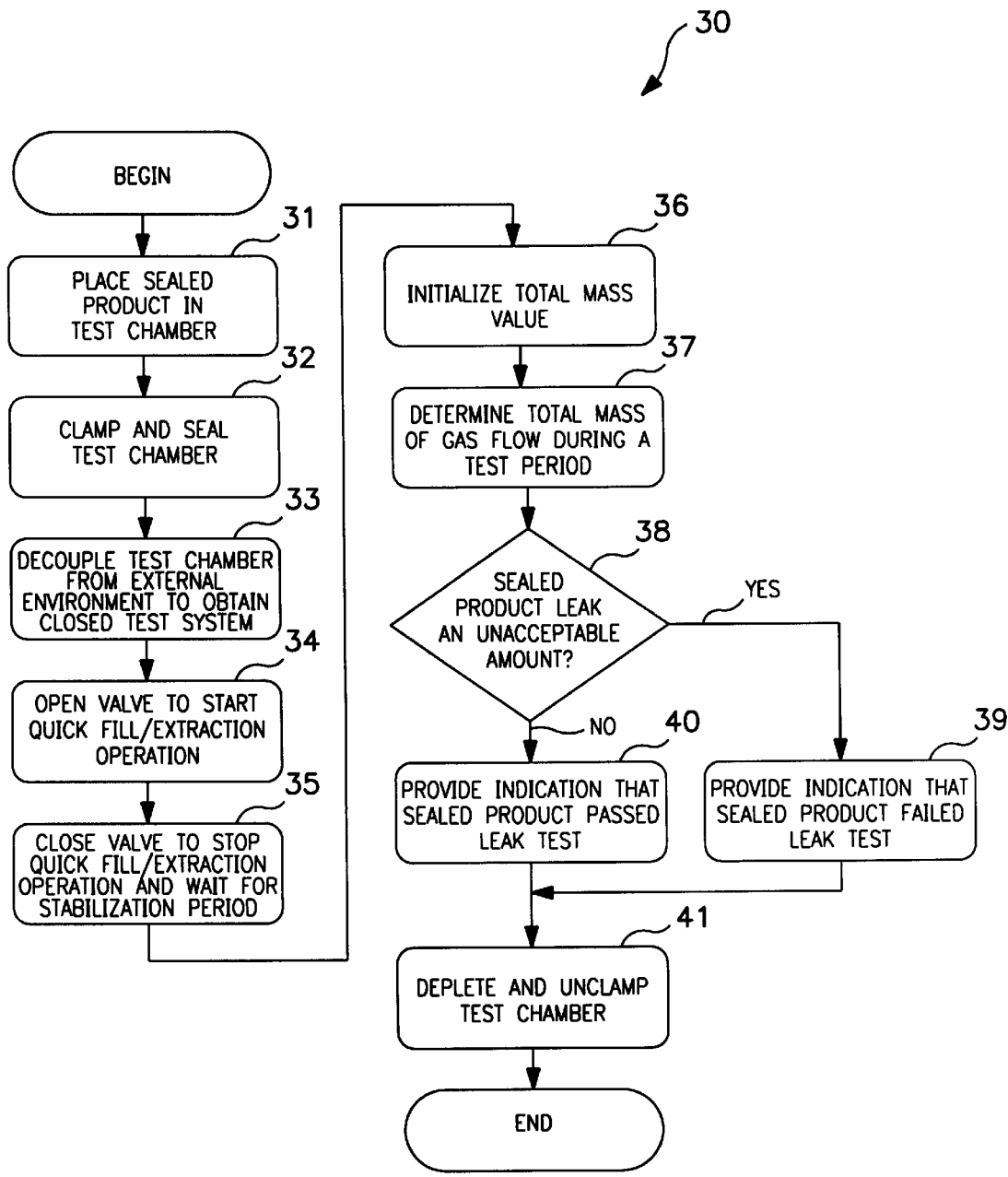
FIG. 3 is a flowchart of a leak detection method implemented by the leak detection system shown in FIG. 1.

Referring now to FIG. 3, there is illustrated a flowchart of a leak detection method 30 implemented by the leak detection system 20. In particular, the leak detection method 30 begins in step 31 with the placement of a sealed product into the receptacle 22 of the test chamber 12. In an exemplary automated system, a mechanical arm or other device places the sealed product into the test chamber 12. Alternatively, a person could place the sealed product into the receptacle 22. Then in step 32, the IGLS 9 generates a clamp signal that causes the cover 24 of the test chamber 12 to clamp into place and seal the test chamber 12. Alternatively, a person could place the cover 24 into place and seal the test chamber 12. After the test chamber 12 is sealed, the IGLS 9 in step 33 generates a control signal that causes the exhaust/pressure valve 10 to operably decouple the outlet port 26 of the test chamber 12 from the surrounding environment and couple the outlet port 26 of the test chamber 12 to the pressure system 14 thus creating a closed test system.

In the exemplary embodiment, the IGLS 9 in step 34 generates a control signal that causes the by-pass valve 11 to open for a predetermined quick fill/extraction period (e.g. 3 to 5 seconds). As result of opening the by-pass valve 11, the pressure system 14 via the by-pass conduit 17 quickly either adds mass to or extracts mass from the test chamber 12 to quickly bring the internal pressure of the test chamber 12 closer to the substantially constant pressure maintained by the pressure system 14. In the exemplary embodiment, the IGLS 9 provides a more restrictive gas flow path between the test chamber 12 and the pressure system 14 than the gas flow path provided by the by-pass conduit 17. Accordingly, opening the by-pass valve 11 causes the internal pressure of the test chamber 12 to more quickly approach the substantially constant pressure maintained by the pressure system 14 and reduce the overall time required to test the sealed product. In an exemplary embodiment, the predetermined quick fill/extraction period is determined during a calibration process for the type of test chamber 12 to be used and the type of sealed product to be tested. From the calibration process, the exemplary embodiment determines a quick fill/extraction period that is sufficient for the pressure system 14 to bring the internal pressure of the test chamber 12 near the substantially constant pressure maintained by the pressure system 14.

After performing the quick fill operation in step 34, the IGLS 9 in step 35 generates a control signal that causes the by-pass valve 11 to close and then waits for a predetermined stabilization period (e.g. 0.8 seconds). As a result of closing the by-pass valve 11, gas flow between the test chamber 12 and the pressure system 14 is restricted to pass through the IGLS 9. The IGLS 9 in step 36 initializes a total mass value M that represents the total mass of gas flow during a test period. In particular, the IGLS 9 in an exemplary embodiment initializes the total mass value M to a value of zero.

After the stabilization period, the IGLS 9 in step 37 determines a total mass of gas flow through the IGLS 9 over a predetermined test period (e.g. 5–10 seconds). In particular, the IGLS 9, in an exemplary embodiment, generates at periodic intervals a mass flow rate value $(dM/dt)_n$ representative of the mass flow rate of gas through the IGLS 9 during an interval n and updates the total mass value M after each periodic interval n by adding to the current total mass value M the product of mass flow rate value $(dM/dt)_n$ times the duration of the associated interval n.

The IGLS 9 then in step 38 determines based upon the obtained total mass of gas flow through the IGLS 9 during the test period whether the sealed product leaked an unacceptable amount during the test period. More specifically, the IGLS 9 compares the total mass value M for the gas flow during the test period to a predetermined threshold level and determines that the sealed product leaked an unacceptable amount if the total mass has a predetermined relationship to the threshold level. For example, the pressure system 14 in an exemplary embodiment applies a low vacuum to the test chamber and the IGLS 9 determines that the sealed product leaked an unacceptable amount if the total mass is greater than the predetermined threshold.

As should be appreciated to those skilled in the art, the leak detection system 20 when testing a series of sealed products should extract a relatively constant amount of mass from the test chamber 12 during each test period if the sealed products do not leak. However, if a sealed product does leak, then the leak detection system 20 should extract additional mass from the test chamber 12 that is attributable to the mass leaked by the sealed product. In this manner, the leak detection system 20 is operable to detect whether a sealed product leaked an unacceptable amount during the test period. Moreover, by extending the duration of the test period, the leak detection system 20 may more accurately detect smaller leaks.

If the IGLS 9 in step 38 determines that the sealed product leaked an unacceptable amount during the test period, then the IGLS 9 in step 39 provides an indication that the sealed product failed the leak test. Conversely, if the IGLS 9 in step 38 determines that the sealed product did not leak an unacceptable amount during the test period, then the IGLS 9 in step 40 provides an indication that the sealed product passed the leak test. As should be appreciated by those skilled in the art, the IGLS 9 may provide the above status indications in many known manners such as distinguishing audible tones, visible lights, textual displays, and/or electronic signals. After indicating the status of the sealed product, the IGLS 9 generates a control signal that causes the test chamber 12 to deplete and the cover 24 of the test chamber 12 to unclamp from the receptacle 22. Alternatively, a person could manually cause the test chamber 12 to deplete and manually unclamp the cover 24 from the receptacle 22 of the test chamber 12.

Figure 4:
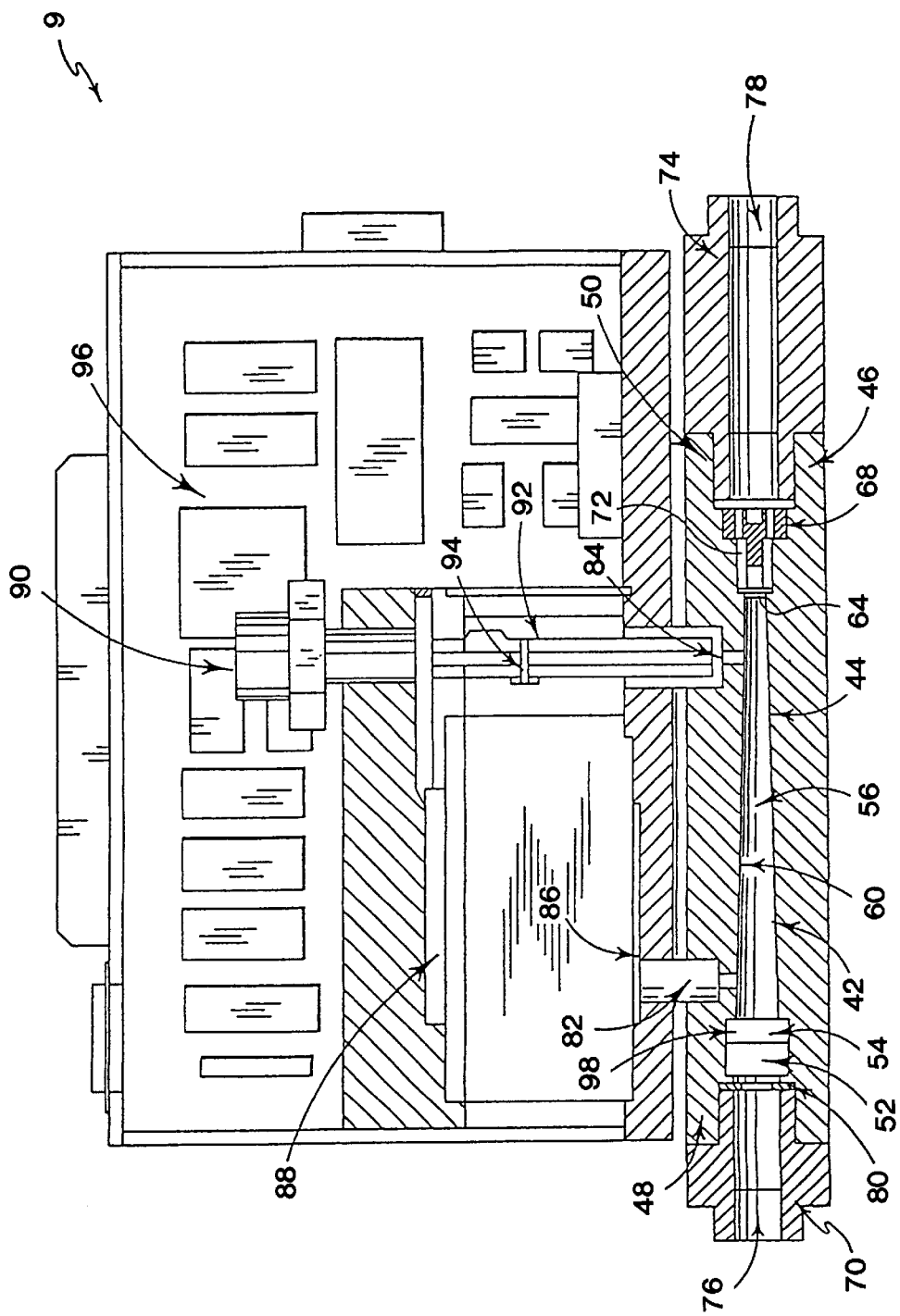
FIG. 4 is a section diagram of the intelligent gas leak sensor of the leak detection system shown in FIG. 1.

An exemplary embodiment of the IGLS 9 is depicted in greater detail in FIG. 4. As depicted, the as IGLS 9 includes a body 46 made of 304 or 304L stainless steel or other similar material for improved tolerance characteristics, machining capabilities, temperature stability and increased tolerance to various gases. The body 46 has a first end portion 48 and a second end portion 50. The external profile of the body 46 is cylindrical and varies in size in correlation to the flow rate of the gas. A conical-shaped center shaft 42 is inserted into a precisely machined conical bore 44 within the body 46. The center shaft 42 comprises a cylindrical portion 52, a chamfer 54, and a conical portion 56. Pressure is transferred through a second receiving port 84 to a columnar housing 92 to a second pressure housing 88.

Figure 5:
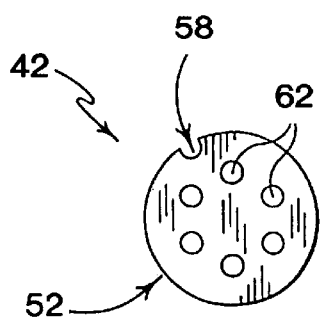
FIG. 5 is an end view of the cylindrical portion of the center shaft of the intelligent gas leak sensor shown in FIG. 4.

The cylindrical portion 52, better illustrated in FIG. 5, also contains a first machined bore 58 for receipt of a dowel pin (not shown) which allows the dowel pin to be press fit into the first machined bore 58. The body 46 contains a second machined bore (not shown) which allows the dowel pin to pass through the second machined bore forming a keyway such that the center shaft 42 can be removed and cleaned without the need for recalibration, i.e. the center shaft 42 can be inserted into its original position in terms of orientation.

Preferably the conical portion 56 of the center shaft 42 shall have a total angle between 10 degrees and 1 degree with an optimum angle of 2 to 6 degrees. The location of the center shaft 42 within the bore 44 is positioned in part by the use of a spring washer (not shown) and forms a laminar flow gap 60 between the inner portion of the bore 44 and the conical portion 56 of the center shaft 42. The laminar flow gap 60 is uniform along the length of the conical portion 56 of the center shaft 42 such that a laminar flow of gas through the laminar flow gap 60 results. In the exemplary embodiment, the laminar flow gap 60 has a width that results in a Reynold number of less than 700. Laminar flow of gas through the laminar flow gap 60 provides more accurate pressure measurements and flow calculations than would result from more turbulent flow. With the conical shape and the ability to adjust the center shaft 42 for calibration, the flow can be accelerated or decelerated to obtain a polynomial relationship for leak test. The measurement taken is amplified by the use of typical amplifiers on the market to improve the accuracy of the readings.

The center shaft 42 has an inlet end or cylindrical portion 52 precisely located in bore 44 to support the conical portion 56 of the center shaft 42 such that the center shaft 42 is supported on both ends with a plurality of inlet holes 62 with the exemplary embodiment containing six (6) inlet holes 62. The outlet end 64 of the center shaft 42 is reduced to allow flow to enter outlet ports 72 drilled into the second end portion 50 of the body 46. The 6 outlet ports 72 in the exemplary embodiment are aligned with six (6) holes in a spacer 68 to allow the gas to flow through an outlet end cap 74. The body 46 has the same number of outlet ports 72 drilled in the second end portion 50 of the body 46 to direct the gas flow from the center shaft 42 to the spacer 68.

A first and second end cap 70 and 74, respectively, are attached to the first and second end portions 48 and 50, respectively, of the body 46 to enclose the conical bore 44 and center shaft 42 within the body 46. During exemplary operation of the IGLS, the first end cap 70 functions as an inlet cap and the second end cap 74 functions as an outlet cap. The inlet and outlet end caps 70 and 74, respectively, are attached to the body 46 using typical fasteners available on the market, such as screws rotated into threaded holes in the body 46. The center of the first and second end caps 70 and 74, respectively, contain a first and second bore 76 and 78 to allow the gas to flow through each of the first and second end caps, 70 and 74, respectively.

The center shaft 42 is adjusted within the bore using the spacer 68 machined to a precise dimension such that the spacer 68 located at the outlet end 64 of the center shaft 42 and the spring washer 80 located at the inlet end 52 of the center shaft 42 position the center shaft 42 and hold it in place in a calibrated position. This design provides a unit where the calibration remains constant and can only be modified with a spacer 68 of a different dimension.

Alternatively, the center shaft 42 could be calibrated using an adjusting screw or a calibrated locating cylinder at the second end portion 50 of the body 46 or the narrow end of the conical portion 56 of the center shaft 42. The spacer 68 is threaded and the adjusting screw can be adjusted by rotating the adjusting screw clockwise or counterclockwise to position the center shaft 42 according to calibration measurements. The adjusting screw and a spring washer 80 located at the inlet end 52 of the center shaft 42 apply the appropriate forces to locate the center shaft 42 and hold it in place to provide for a uniform but adjustable gap 60 between the conical portion 56 of the center shaft 42 and the surface of the conical bore 44 within the body 46.

A first receiving port 82 and a second receiving port 84 are drilled in the body 46 to monitor the pressure differences in the laminar flow around the conical center shaft 42. The first receiving 82 port is drilled into the top side of the body 46 and extends from the top side of the body 46 to the conical bore 44 within the body 46. The first receiving port 82 can be located anywhere along the conical bore 44 where L/h>50. In this equation, the length from the edge of the conical portion 56 of the center shaft 42 to the location of the first receiving port 82 is "L" and the height between the outer wall of the conical portion 56 of the center shaft 42 and the inner wall of the machined bore 58 is "h" or the height of the laminar flow gas.

The second receiving port 84 is also drilled in the top side of the body 46 and is located downstream of the first receiving port 82 or toward the smaller end of the conical center shaft 42. The second receiving port 84 also extends from the top side of the body 46 to the conical bore 44. The second receiving port 84 can be located at a second position anywhere between the first receiving port 82 and the outlet end 64 of the center shaft 42 but it is preferable for the first and second receiving ports, 82 and 84, respectively, to be separated by a distance sufficient to maintain a constant differential pressure per inch of flow length which is usually 2 to 3 inches.

The positions of the first receiving port 82 and the second receiving port 84 are designed to be located sufficiently within the laminar flow gap 60 such that the laminar flow of the gas is fully developed and little or no turbulence in the gas flow exists.

Gas enters the first receiving port 82 and flows to a first pressure chamber or first diaphragm 86 with a movable outer wall. Gas also enters the second receiving port 84 and flows through the columnar housing to a second pressure chamber or second diaphragm 88 also with a movable outer wall. The force that the first pressure chamber 86 exerts against the second pressure chamber 88 measures the relative displacement of the first and second diaphragms, 86 and 88 respectively, and a value for the differential pressure can be determined. The first and second diaphragms, 86 and 88, respectively, are located off center from the body 46 and center shaft 42 to minimize volumetric changes and increase response time. The first receiving port 82, the second receiving port 84, the first diaphragm 86 and the second diaphragm 88 all form the first pressure sensor or differential pressure sensor that generates a differential pressure signal indicative of the sensed differential pressure. This type of differential pressure measurement is termed capacitance technology and is commonly known in the industry.

The second pressure sensor or static pressure sensor 90 is located within the columnar housing 92. A static pressure sensor 90 is located on the top of the columnar housing 92 to measure static pressure within the laminar flow gap 90. In the exemplary embodiment, the static pressure sensor 90 is exposed to the same gas flow as that of the second diaphragm 88.

A temperature sensor 94 is located on the side of the columnar housing 92 to measure the temperature within the columnar housing 92. The temperature sensor 94 is attached to a portion of the columnar housing 92 which has been machined to a point in which the air temperature within the columnar housing 92 is the same as that of the thin, machined columnar housing 92 wall. The temperature sensor 94 is a typical RTD type sensor commonly used in the industry. The columnar housing 92 has tolerance expansion capabilities by positioning an o-ring at each end of the columnar housing 92. The o-rings seal the columnar housing 92 for accurate measurement but also allow the columnar housing 92 to expand or contract to allow for temperature differences and dimensional tolerances.

A microcontroller card 96 is connected to the sensors to record all the measurements, provide mathematical correlation polynomial equations, perform temperature and pressure compensation, display readings on an LCD display including pressure, flow, total mass, and other messages, control the valve sequence for leak test purposes using digital I/O signals, communicate to a personal computer for setup and data acquisition, provide pressure/flow control and send analog signals to remote devices, such as personal computers. The microcontroller can take such measurements and perform such calculations for gas flowing in either direction within the body. Further, the microcontroller can measure acceleration and deceleration for sensitivity and repeatability of the calculations.

The microcontroller card 96, the differential pressure sensor and the static pressure sensor 90 are located within a housing or enclosure to protect the components from damage and to make the entire piece of equipment more attractive. On the outside of the enclosure an LCD display is mounted to display various messages to inform the user of measurement results and other messages. Also located on the outside of the enclosure is a start/stop button to start or stop a particular test.

The conical portion 56 of the center shaft 42 allows adjustment of the maximum flow rate through the IGLS 9 by adjusting the position of the center shaft 42 within the conical bore 44 and/or by matching the conical portion 56 of the center shaft 42 with the conical bore 44. Cone matching allows for better accuracy than cylindrical shapes due to accuracy effects caused by imperfections on the cylindrical surface and consequently, the flow rate can be adjusted to a point just above the value desired and more accurate leak detection is attained. The above-described design in an exemplary embodiment can accommodate pressures up to 1000 psia and differential pressures from 2 inches water to 135 inches water.

Referring now to FIG. 5, an end view of the center shaft 42 is shown which illustrates the plurality of inlet holes 62 in the inlet end 52 of the center shaft 42 and the first machined bore 58 for receipt of a dowel pin. The inlet holes 62 allow the gas to flow through the cylindrical portion 52 of the center shaft 42 and direct the flow around the conical portion 56 of the center shaft 42 as further illustrated below.

Figure 6:
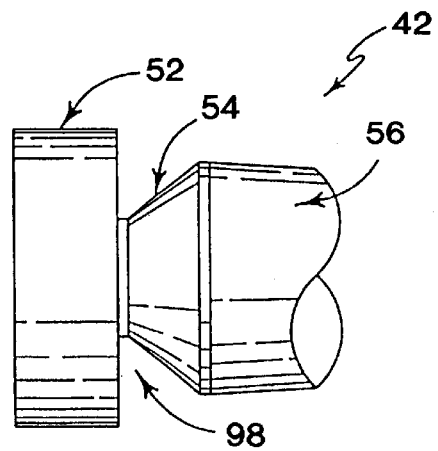
FIG. 6 is an detail view of the cylindrical portion and chamfer of the center shaft the intelligent gas leak sensor shown in FIG. 4.

Referring now to FIG. 6, a detail of the inlet end 52 of the center shaft 42 is shown. The 6 inlet holes 62 are drilled through a round cylindrical portion 52 of the center shaft 42, shown in FIG. 2, such that an opening or equalization chamber 98 is created due to the chamfer 54 of the center shaft 42 immediately after the cylindrical portion 52 of the center shaft 42 that allows the gas to flow in an orderly fashion to the laminar flow gap 60 created by the center shaft 42 and the conical bore 44. The gas flow enters the inlet holes 62 in the cylindrical portion 52 and after striking a chamfer 54, the gas flow is directed toward the conical portion 56 of the center shaft 42. The gas then flows along the conical portion 56 within the laminar flow gap 60 created by the conical bore 44 and the outer surface of the conical portion 56 of the center shaft 42.

Figure 7:
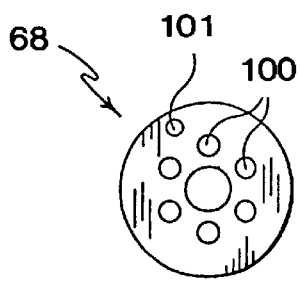
FIG. 7 is an end view of the spacer of the intelligent gas leak sensor shown in FIG. 4.

Referring now to FIG. 7, an end view of the spacer 68 is shown which illustrates the plurality of spacer outlet holes 100. The spacer outlet holes 100 align with the 6 outlet ports 72 drilled in the second end portion 50 of the body 46 which allows the gas to pass through to the end cap 74. The spacer 68 contains a pin 101 on its outer periphery for insertion within a hole in the body 46 to allow for precise repeatability when the components are removed and then reassembled for maintenance cleaning.

Figure 8:
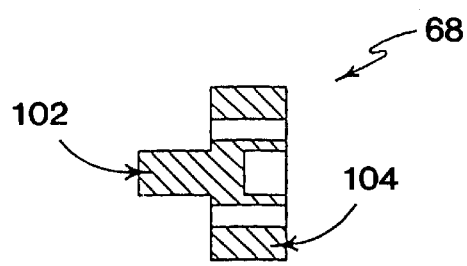
FIG. 8 is a side view of the spacer shown in FIG. 7.

Referring now to FIG. 8, a side view of the spacer 68 is shown which illustrates the positioning structure of the spacer 68. A small cylindrical portion 102 protrudes from the larger cylindrical portion 104 which comes into contact with the outlet end 64 of the center shaft 42 to hold the center shaft 42 in place.

Figure 9:
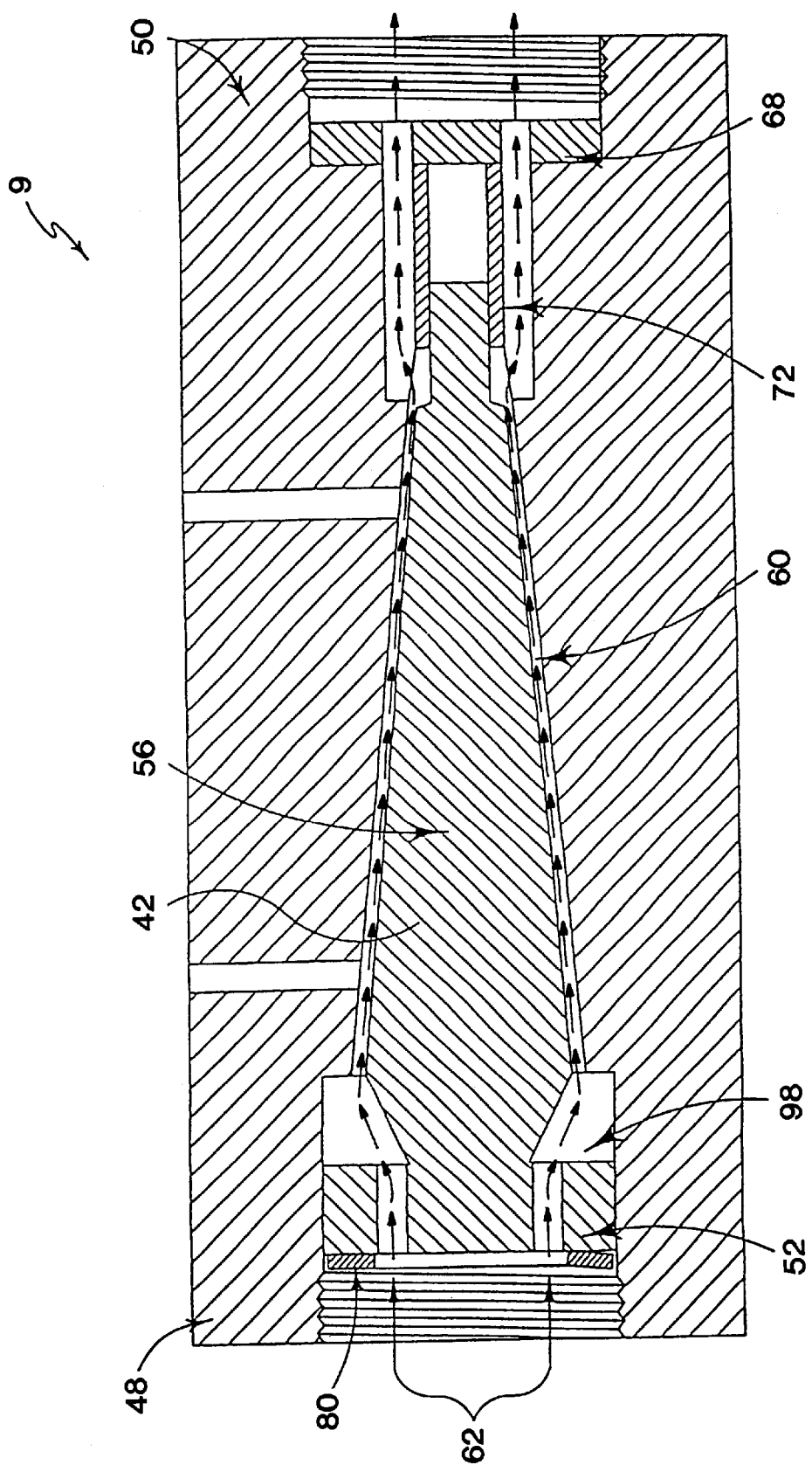
FIG. 9 is a section view of the flow pattern of gas through the intelligent gas leak sensor shown in FIG. 4.

Referring now to FIG. 9, a section view is shown which illustrates the flow pattern of the device in the leak test mode. The flow enters the first end portion 48 of the body 46 or is the end in which the center shaft 42 is larger. The gas flows through the plurality of inlet holes 62 in the inlet end 52 of the center shaft 42, which in this instance is 6 holes and enters an equalization chamber 98 formed by the external shape of the center shaft 42 and the internal bore of the center bore 44. The gas then flows up one side of the equalization chamber 98 and enters the laminar flow gap 60 between the outer portion of the center shaft 42 and the inner portion of the center bore 44. The laminar flow gap 60 is uniform for the length of the conical portion 56 of the center shaft 42 until the gas reaches the outlet ports 72 for the device. The gas flows through the 6 outlet ports 72 drilled in the body 46 and through 6 holes in the spacer 68. From there the gas flows through the outlet end cap (not shown).

Having set forth the structure of the apparatus, the equations and computations used to calculate flow and leak detection will now be reviewed.

The basic mathematical model of PID in a continuous system is common and can be expressed as:

$$e(t) = G_d - G(t)$$

where e(t) represents error; $G_d$ represents desired flow or pressure setpoint; and G(t) represents measurement of the actual value (static pressure control) or polynomial fit (for flow control).

Then output correction for the PID controller is:

$$x(t) = K_p e(t) + K_i \int_0^T e(t) + K_d \frac{de(t)}{dt} \bigg|_{t=T}$$

where $K_p$ represents a proportional coefficient; $K_i$ represents an integral coefficient; $Kd$ represents a differential coefficient, and x(t) represents an output correction.

In a discrete system, the equation can be converted into $$X(z) = \left[K_{pd} + \frac{K_{id}}{1-z^{-1}} + K_{dd}(1-z^{-1})\right]E(z)$$

where $K_{pd}$ represents $(K_p-T)/2$; $K_{id}$ represents $K_i/T$; $K_{dd}$ represents $K_d/T$; and T represents the sampling rate.

The flow calculation algorithms are segmented into viscosity calculation, density calculation, volumetric flow calculation, mass flow calculation, temperature compensation, and total mass calculation. The equations for viscosity calculation and density calculation are common. The equations for volumetric flow calculation, the x value and mass flow are modifications of equations contained in a published paper. The Proceeding of the Second International Symposium On Flow on Mar. 23–26, 1981 in St. Louis, Mo. sponsored by Instrument Society of America ISA) and authored by David A Todd. The combination of the use of these equations enables the software to use a universal calibration curve that is embedded in microprocessor. Consequently, the Gas Constant (R), compressibility factor z, and the viscosity data is downloaded from the software program for a particular gas and pressure and the need to recalibrate the sensor is eliminated.

The equation for temperature compensation was developed to allow for thermal expansion. The temperature compensation is performed for high accuracy flow measurement for calibration. In an exemplary embodiment, the flow components which come into contact with the gas flow are made of the same material so that each of the components demonstrates equal temperature effects.

The viscosity calculation is represented by the following equation:

$$\mu = \mu_0(1+C(T-T_0))$$

where $\mu_0$ represents viscosity at temperature $T_0$; $T_0$ represents the calibration temperature; C represents a constant slope for one particular gas type; and T represents temperature in application.

The density calculation is represented by the following calculation:

$$D = \frac{P_S}{z * R * T}$$

where D represents the density of the gas; R represents the universal gas constant, T represents the absolute temperature of the gas measured by RTD Sensor (K); $P_S$ represents the absolute pressure measured by press Sensor (kPa); and z represents a compressibility factor for the gas.

The x value used in the flow calculations is calculated by the following calculation:

$$x = \frac{D * dP}{\mu^2}$$

where dP represents the measured differential pressure in A/D counts.

The volumetric flow calculation is based on the polynomial coefficient and the differential pressure measurement as follows:

$$Q = (C_0 + C_1 x + C_2 x^2 + C_3 x^3) * \mu/D$$

The mass flow calculation is based on the following formula:

$$dM/dt = (C_0 + C_1 x + C_2 x^2 + C_3 x^3) * \mu$$

Coefficients $C_0$, $C_1$, $C_2$ and $C_3$ have been found different from temperature to temperature due to the thermal expansion of the center shaft. Based on the calibration in the desired temperature range, K was developed to reflect the changes. K is dependent on the thermal coefficient α of the material used. Thus the equation for temperature compensation is as follows:

$$Q = K \cdot (C_0 + C_1 x + C_2 x^2 + C_3 x^3) * \mu/D$$
$$dM/dt = K \cdot (C_0 + C_1 x + C_2 x^2 + C_3 x^3) * \mu$$
$$K = 1 + \alpha_1 \cdot (T-T_0) + \alpha_2 \cdot (T-T_0)^2$$

From the temperature compensated values for mass flow rate dM/dt, the total mass M of gas flow over a test period $T_p$ may be obtained from the following equation:

$$M = \int_0^{T_p} (dM/dt) dt$$

which in essence integrates the mass flow rate dM/dt over the test period $T_p$. Those skilled in the art should appreciate that the above integration may be approximated in a discrete system by multiplying the mass flow rate $(dM/dt)_n$ obtained for each discrete interval n over the test period $T_p$ by the duration $t_n$ of each discrete interval n and summing the products as represented by the following equation:

$$M = \sum_{n=0}^{T_p} (dM/dt)_n * t_n$$

The apparatus uses computer software embedded in the microcontroller to allow the user to easily adjust the function parameters and incorporate the mathematical equations discussed above. The embedded software is designed to use "flags" for different applications. The following describes Leak-Tek™ software executed by a general purpose computer system detachably coupled to the IGLS 9 in order to configure the IGLS 9, receive data from the IGLS 9, and store data from the IGLS 9 for future analysisdescription of the software screens below and the above-described flowchart of FIG. 3 demonstrate the process used by the software.

The initial main screen the Leak-Tek™ software allows the user to enter test parameters (setup screen), configure the software and the IGLS 9 or calibrate the IGLS 9 (calibration and configuration screens), load and analyze previous test data files (SPC screen) or exit the software program (exit screen).

The setup screen allows a user to perform a variety of tasks and allows access to a run screen and a part data screen. The setup screen allows a user to perform the functions listed below:

choose a sensor for a test;

choose from a predefined list of units for temperature, pressure, time base, and flow units;

enter test parameters such as part number, part name or description, and test fill delay time;

enter parameters pertaining to gas parameters as used in a test;

add, delete or load part data from a database file;

set a pressure at which to perform the test set high and low pressure limits or thresholds that trigger a fault when reached or surpassed;

run a leak test via the run screen;

save setup screen parameters to a datafile;

download setup screen parameters to the IGLS 9 including gas constants;

upload setup parameters from the IGLS 9;

exit setup screen to main screen; and print current setup information.

The run screen can be accessed from the setup screen to allow a user to choose a sensor for a test, save test data to a file for statistical process control (SPC) analysis, automatically save test data into a data file for SPC analysis upon each test conducted, or exit back to the setup screen.

The setup screen allows the user to choose part setup data from a data file, add a new part number and description to the part data file, delete an obsolete part from the data file, or exit back to the setup screen.

The configuration screen can be accessed from the main screen and allows a user to choose a sensor for a test, to enter PID parameters, to choose the COMM port used by the computer to communicate with the microcontroller, to provide the coefficients needed by the microcontroller to perform the appropriate flow calculations, to enable remote clamping, to enable automatic fill, to enable automatic pressurizing, to enable total mass calculations, to set the buffer size for a particular set of test data, to save configuration data parameters to a data file, to download configuration parameters to a sensor in the test as well as a data file, to upload configuration parameters from a sensor, or to exit back to the main screen. The configuration screen also allows the user to access the calibration screen. There are three calibration choices in the configuration screen: temperature, flow rate and static pressure. Either of these "buttons" can be chosen in the configuration screen and each will allow the user to access the calibration screen. The "button" chosen in the configuration screen will determine which sensor will be calibrated in the calibration screen.

The user in the configuration screen will also be allowed to select the operating mode. In particular the user in may select an automatic leak detection mode in which the microcontroller controls valves of the test system, or a manual leak detection mode which sets the test in a manual mode without PID control.

The calibration screen can be accessed as discussed earlier from the configuration screen. The calibration screen allows the user to enter a standard in the third column of the calibration parameters table to determine a percent error during the calibration process, to examine the offset and slope for the collected calibration date, to capture a count for data analysis, to download new calibration parameters into the IGLS 9, to remove a data point or to exit back to the configuration screen.

The final screen that can be accessed from the main screen is the SPC screen which allows the user to view X-bar and R charts from ASCII (comma separated value) CSV files generated from the test screen, to load a CSV file for analysis, to examine an SPC analysis of a currently loaded CSV file, or to exit back to the main screen.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit of the invention are desired to be protected. For example, the above description primarily describes an exemplary leak detection system 20 that applies a low vacuum to the test chamber 12 in order to extract mass from the test chamber 12. However, the leak detection system 20 may alternatively be implemented to apply a higher pressure to the test chamber 12 in order to cause mass to be added to the test chamber 12.

What is claimed is:

1. A method of testing a sealed product for leaks with a leak sensor that develops a laminar flow of a gas arid determines a mass flow rate of the gas based upon differential pressure between a first point and a second point of the laminar flow, temperature of the laminar flow, and static pressure of the laminar flow, the method comprising the steps of:

placing said sealed product into a test chamber;

sealing said test chamber after said placing step to obtain a sealed test chamber at an initial internal pressure;

maintaining in a pressure system, a substantially constant internal pressure that is different than said initial internal pressure of said sealed test chamber;

directing gas flow between said sealed test chamber and said pressure system through the leak sensor during a test period thereby causing said sealed test chamber to a said substantially constant internal pressure of said pressure system;

obtaining via the leak sensor a value representative of a total mass of said gas flow between said sealed test chamber and said pressure system during said test period; and determining, based upon said value obtained for said total mass of said gas flow, whether said scaled product leaked an unacceptable amount during said test period.

2. The method of claim 1, further comprising the step of directing, for a predermined period prior to said test period, said gas flow through a by-pass conduit that permits a higher flow rate than permitted by said leak sensor.

3. The method of claim 1, wherein said obtaining step comprises the steps of:

obtaining during said test period, a plurality of mass flow values that are each representative of a mass flow rate of said gas flows at a separate periodic interval, and calculating said value for said total mass of said gas flow based upon said plurality of mass flow values.

4. The method of claim 1, wherein said determining step comprises the step of:

determining that said sealed product leaked an unacceptable amount during said test period if said value for said total mass of said flow has a predetermined relationship to a predetermined threshold value.

5. The method of claim 1, further comprising the step of:

generating an indication of a leak failure if said determining step determines that said sealed product leaked an unacceptable amount during said test period.

6. A leak detection system for testing a sealed product for leaks, comprising:

a test chamber comprising a receptacle dimensioned to receive said sealed product and to help prevent said sealed product from being destroyed from over expansion, and a cover dimensioned to operably seal said receptacle at an initial internal pressure when placed into position with said receptacle;

a pressure system able to maintain a substantially constant pressure during a test period; and a leak sensor coupled to said test chamber via a first conduit and said pressure system via a second conduit, said leak sensor operable to
  permit gas flow between said test chamber and said pressure system via said first conduit and said second conduit,
obtain a value representative of total mass of said gas flow between said sealed test chamber and said pressure system during said test period, and
determine, based upon said value obtained for said total mass of said gas flow, whether said sealed product leaked an unacceptable amount during said test period, wherein said leak sensor comprises:
a body comprising
  a first end portion operable to be coupled to said test chamber via said first conduit,
a second end portion operable to be coupled to said pressure system via said second conduit, and
a laminar flow gap developed between said first end portion and said second end portion that causes said gas flow through said body to exhibit substantially laminar flow characteristics during said test period;
a differential pressure sensor
  connected to a first point and a second point of said laminar flow gap, and
  operable to generate a differential pressure signal that is representative of said differential pressure between said first point and said second point of said laminar flow gap;
a temperature sensor operable to generate a temperature signal representative of temperature of said gas flow through said laminar flow gap;
a static pressure sensor operable to generate a static pressure signal representative of static pressure developed by said gas flow trough said laminar flow gap, and
a microcontroller connected to said differential pressure sensor, said temperature sensor, and said static pressure sensor and operable to
  calculate said value representative of said total mass of said gas flow between said sealed test chamber and said pressure system during said test period based upon said differential pressure signal, said temperature signal, and said static pressure signal, and
  determine, based upon said value obtained for said total mass of said gas flow, whether said sealed product leaked an unacceptable amount during said test period.

7. The leak detection system of claim 6, further comprising:
  a by-pass conduit coupled to said first conduit and to said second conduit, said by-pass conduit operable to
  cause said gas flow to substantially by-pass said leak sensor, and
  permit a higher flow rate between said test chamber and said pressure said than permitted by said leak sensor; and
  a by-pass valve coupled in-line with said by-pass conduit and operable to permit, based upon a control signal, said gas flow to flow between said scaled test chamber and said pressure system via said by-pass conduit, wherein
  said microcontroller is further operable to generate said control signal for a predetermined period prior to said test period in order to permit said gas flow through said by-pass conduit for said predetermined period.

8. The leak detection system of claim 6, further comprising;
  a by-pass conduit coupled to said first conduit and to said second conduit, said by-pass conduit operable to
  cause said gas flow to substantially by-pass said leak sensor, and
  permit a higher flow rate between said test chamber and said pressure chamber than permitted by said leak sensor; and
  a by-pass valve coupled in-line with said by-pass conduit and operable to permit, based upon a control signal, said gas flow to flow between said sealed test chamber and said pressure system via said by-pass conduit, wherein
  said leak sensor is operable to generate said control signal such that said by-pass valve directs said gas flow through said by-pass conduit for a predetermined period prior to said test period.

9. The leak detection system of claim 6, wherein said leak sensor is further operable to:
  obtain during said test period, a plurality of mass flow values that are each representative of a mass flow rate of said gas flow at a separate periodic interval, and
  calculate said value for said total mass of said gas flow based upon said plurality of mass flow values.

10. The leak detection system of claim 6, wherein said leak sensor is further operable to:
  determine that said scaled product leaked an unacceptable amount during said test period if said value for said total mass of said gas flow has a predetermined relationship to a predetermined threshold value.

11. The leak detection system of claim 6, wherein said leak sensor is further operable to:
  generate an indication of a leak failure if said sealed product leaked an unacceptable amount during said test period.

12. For use with a pressure system operable to maintain a substantially constant pressure during a test period and a sealed test chamber containing a sealed product, a leak sensor comprising:
  a body comprising
    a first end portion operable to be coupled to said test chamber via a first conduit,
    a second end portion operable to be coupled to said pressure system via a second conduit, and
    a laminar flow gap between said first end portion and said second end portion that causes gas flowing through said body to exhibit substantially laminar flow characteristics during said test period;
  a differential pressure sensor
    connected to a first point and a second point of said laminar flow gap, and
    operable to generate a differential pressure signal that is representative of said differential pressure between said first point and said second point of said laminar flow gap;
  a temperature sensor operable to generate a temperature signal representative of temperature of said gas flow through said laminar flow gap;
  a static pressure sensor operable to generate a static pressure signal representative of static pressure developed by said gas flow through said laminar flow gap; and
  a microcontroller connected to said differential pressure sensor, said temperature sensor, and said static pressure sensor and operable to calculate said value representative of said total mass of said gas flow between said sealed test chamber and said pressure system during said test period based upon said differential pressure signal, said temperature signal, and said static pressure sensor; and determine, based upon said value obtained for said total mass of said gas flow, whether said sealed product leaked an unacceptable amount during said test period.

13. The leak sensor of claim 12, wherein said microcontroller is further operable to actuate a by-pass valve that substantially directs said gas flow between said test chamber and said pressure system through a by-pass conduit permitting a higher flow rate than permitted by said laminar flow gap.

14. The leak sensor of claim 12, wherein said microcontroller is further operable to obtain during said test period, a plurality of mass flow values that are each representative of a mass flow rate of said gas flow at a separate periodic interval, and calculate said value for said total mass of said gas flow based upon said plurality of mass flow values.

15. The leak sensor of claim 12, wherein said microcontroller is further operable to determine that said sealed product leaked an unacceptable amount during said test period if said value for said total mass of said gas flow has a predetermined relationship to a predetermined threshold value.

16. The leak sensor of claim 12, wherein said microcontroller is further operable to generate an indication of a leak failure if said sealed product leaked an unacceptable amount during said test period.

* * * * *